(12) United States Patent
Smith

(10) Patent No.: US 7,255,362 B2
(45) Date of Patent: Aug. 14, 2007

(54) TILTABLE TRAILER HITCH

(76) Inventor: Lane Smith, P.O. Box 27366, Knoxville, TN (US) 37927

( * ) Notice: Subject to any disclaimer, the term of this patent is extended or adjusted under 35 U.S.C. 154(b) by 134 days.

(21) Appl. No.: 11/156,247

(22) Filed: Jun. 17, 2005

(65) Prior Publication Data

US 2006/0284396 A1 Dec. 21, 2006

(51) Int. Cl.
*B60D 1/155* (2006.01)
(52) U.S. Cl. .................. 280/490.1; 280/489; 280/488; 280/491.1; 280/494; 280/462; 280/491.3; 280/491.5
(58) Field of Classification Search ............ 280/490.1, 280/489, 488, 491.1, 494, 462, 491.3, 491.5
See application file for complete search history.

(56) References Cited

U.S. PATENT DOCUMENTS

| | | | |
|---|---|---|---|
| 3,891,239 A | 6/1975 | Leo et al. | |
| 4,570,966 A | 2/1986 | Giboney et al. | |
| 4,929,028 A | 5/1990 | Underwood | |
| 4,946,182 A | 8/1990 | Weber | |
| 5,226,657 A * | 7/1993 | Dolphin | 280/478.1 |
| 5,375,867 A * | 12/1994 | Kass et al. | 280/457 |
| 5,934,698 A * | 8/1999 | Despain | 280/490.1 |
| 6,155,588 A * | 12/2000 | Maxey | 280/488 |
| 6,726,237 B1 | 4/2004 | Carrico | |
| 7,093,845 B1* | 8/2006 | Fast | 280/489 |
| 2003/0184048 A1* | 10/2003 | Bonde | 280/491.5 |

* cited by examiner

*Primary Examiner*—Lesley D. Morris
*Assistant Examiner*—Marlon Arce-Diaz
(74) *Attorney, Agent, or Firm*—Pitts & Brittian, PC

(57) ABSTRACT

A tiltable trailer hitch for assisting in the loading and unloading of a trailer. The hitch includes a shank adapted to be received within a conventional trailer hitch and a ballmount pivotally mounted on the shank. An adjustment bracket is carried by the shank and is adapted to attach a ballmount. The adjustment bracket defines cooperating pairs of first openings and cooperating pairs of second openings. The second openings are radially spaced apart about a first of the first openings. The first openings are radially spaced apart about a first of the second openings. The ballmount defines first and second openings for cooperatively receiving the first and second ballmount locking pins. The trailer is tilted up or down by moving the first and second ballmount locking pins up and down within the cooperating pairs of first and second openings.

9 Claims, 5 Drawing Sheets

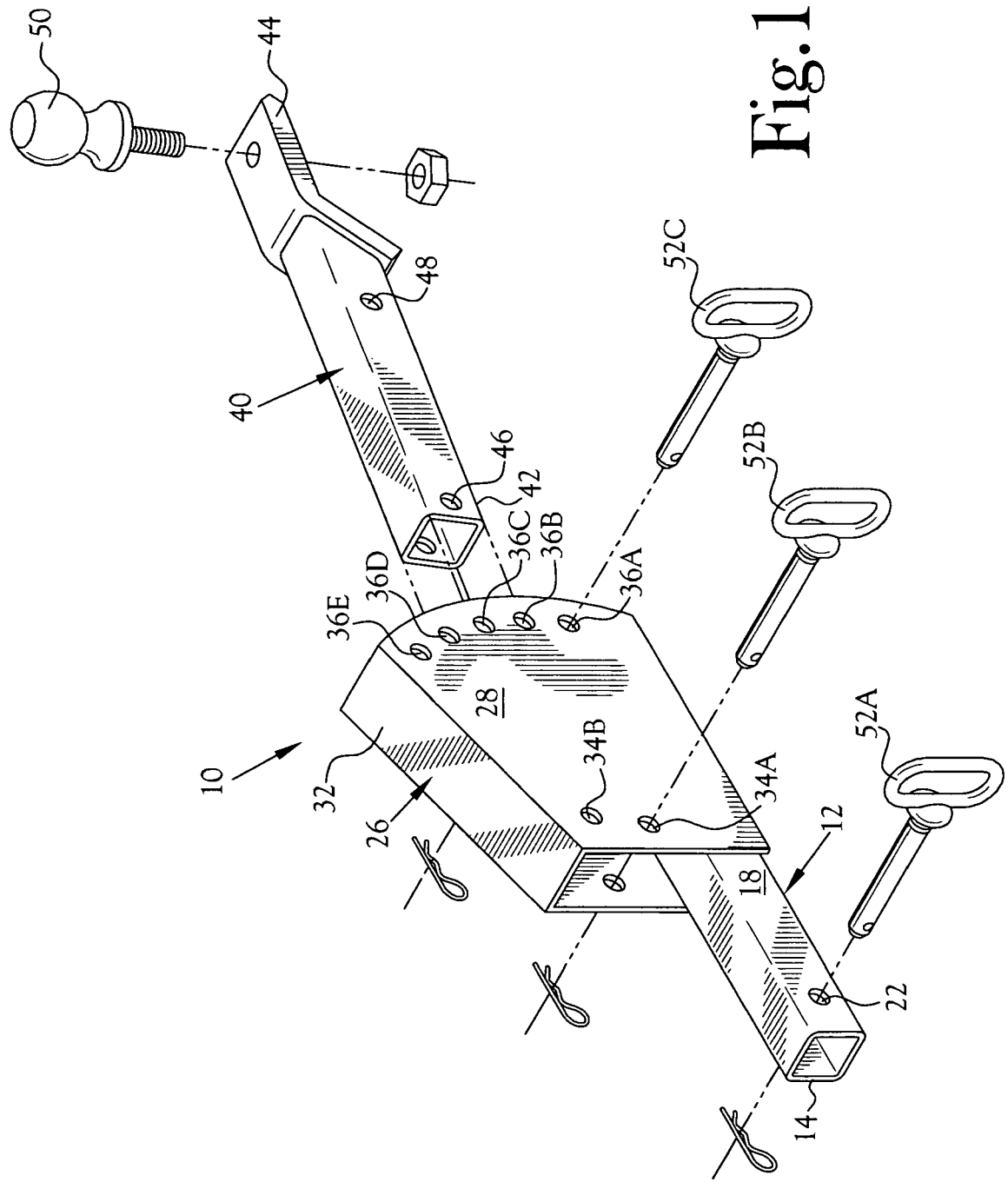

TILTABLE TRAILER HITCH

CROSS-REFERENCE TO RELATED APPLICATIONS

Not Applicable.

STATEMENT REGARDING FEDERALLY SPONSORED RESEARCH OR DEVELOPMENT

Not Applicable

BACKGROUND OF THE INVENTION

1. Field of Invention

The present invention pertains to the field of vehicle trailers. More particularly, this invention is related to a trailer hitch configured to selectively tilt relative to the towing vehicle in order to reduce an angle of incline between a loading ramp and each of the trailer deck and the surface on or from which the trailered vehicle is being unloaded or loaded.

2. Description of the Related Art

In the field of towing, it is well known that trailers are often used to transport vehicles of various types and sizes. Transported vehicles, such as automobiles, construction equipment and military equipment, roll on and off the loading end of the trailer. Typically, ramps are used to roll equipment or automobiles up the short height. The ramps are installed between the trailer deck and the ground or other surface onto which the vehicle is to be unloaded or from which the vehicle is being unloaded. An obtuse angle is defined between the ramps and the trailer deck. Similarly, an acute angle is defined between the ramps and the ground.

When the vehicle is being loaded or unloaded, the acute angle at the bottom of the ramp often creates a clearance problem between the vehicle and the trailer. For a vehicle being driven forward onto the trailer, the clearance problem exists between the front end of the vehicle and the ramp. Further, the obtuse angle at the top of the ramp creates a clearance problem between the portion of the vehicle between the axles and the loading end of the trailer. For vehicles such as "low riders" which have a ground clearance of only a few inches, the interference between the vehicle and the ramps or the ground are more profound. For vehicles such as construction equipment and military vehicles which include endless loop belt drives, the vehicle is loaded or unloaded slowly until an equilibrium point is surpassed and the vehicle tilts in an opposing direction. Specifically, when a tank, for example, is being loaded onto a trailer, the front end of the tank extends into the air above the trailer until the tank is advanced far enough onto the ramps such that the center of mass is above the top of the ramps. After this point, the tank pivots and "lands" on the trailer. When unloading, this "landing" takes place on either the ramps or the ground. In each situation, the loading and unloading of such equipment is to some extent uncontrolled.

Various configurations of ramps have been devised to assist in loading and unloading vehicles on and off trailers. Additionally, various complex mechanical devices have been devised to be carried the vehicle or the trailer to assist in tilting the trailer in order to reduce the respective angles between the trailer, the ramp and the ground. Various of these devices are provided for eliminating the ramps altogether.

Typical of the art are those devices disclosed in the following U.S. Patents:

| U.S. Pat. No. | Inventor(s) | Issue Date |
|---|---|---|
| 3,891,239 | J. D. Leo et al. | Jun. 24, 1975 |
| 4,570,966 | G. W. Giboney et al. | Feb. 18, 1986 |
| 4,929,028 | L. A. Underwood | May 29, 1990 |
| 4,946,182 | R. Weber | Aug. 7, 1990 |
| 6,155,588 | V. Maxey | Dec. 5, 2000 |
| 6,726,237 | T. J. Carrico | Apr. 27, 2004 |

Of these patents, the '239 patent issued to Leo et al., discloses a tractor truck having a pivoting frame extending from the rear. The frame includes a lateral member on which is provided a laterally adjustable hitching ball. The frame is vertically adjustable via hydraulic actuators.

Giboney et al., in the '966 patent, disclose a retractable hitch ball for "gooseneck" type trailers. The hitch ball is housed within a self-contained unit beneath the bed of a towing vehicle. A hydraulic cylinder is operated from within the towing vehicle for moving an elevating block relative to a pivoted lifting plate which is biased downwardly by a spring. The hitch ball is elevated and lowered vertically through an opening in the towing vehicle to active and inactive positions.

The '028 patent issued to Underwood discloses a hitch apparatus having a movable structure configured for selectively tilting a trailer with respect to the vehicle so as to facilitate loading and unloading equipment, automobiles, materials, onto or off of the trailer. The hitch apparatus includes an elongated chamber-like structure that has an open top and an interior which is in communication with the open top. The chamber-like structure is sized and configured in the manner of a conventional pickup truck bumper. The apparatus further includes a ball hitch movably connected to a trailer. The ball hitch is mounted for movement with respect to the chamber-like structure, so that the combination hitch connection may be selectively positioned through the use of extendable members. The ball hitch may be moved between a lowered position adjacent the chamber-like structure and a raised position above the chamber-like structure.

Weber, in the '182 patent, discloses a towing hitch which includes three or more power cylinders to effect adjustment of the hitch along a central axis in horizontal and vertical directions to accommodate road or site conditions. The hitch may also be used as a rear end jack for the towing vehicle to provide access to the rear tires.

In his '588 patent, Maxey discloses a tilting trailer hitch including a compressible main support assembly having a hitch coupler and a hitching mechanism. The hitch coupler is configured to connect a towing connector to a towing vehicle and the hitching mechanism is configured to couple with a trailer. An actuator is pivotally connected to the main support assembly in response to trailer loading and is operable to rotate part of the main support assembly, thereby raising or lowering the hitching mechanism along a generally arcuate path. When the hitching mechanism is in the raised position, a loading end of the trailer is lowered to assist in loading the trailer.

The '237 patent issued to Carrico discloses a vertically operable hitch including a horizontal support member having a forward end journaled in the receiver of a tow vehicle. An upright post on the support member has a carrier operably mounted thereon for selective vertical movement along the post. A hitch ball is mounted on the carrier for selective connection to the tongue of a towed trailer to thereby selectively raise and lower the hitch ball.

BRIEF SUMMARY OF THE INVENTION

The present invention is a tiltable trailer hitch for assisting in the loading and unloading of a vehicle onto and off of a trailer is disclosed. The tiltable trailer hitch is configured to raise the front end of a trailer, thereby lowering the rear end whereby the respective angles between the trailer, the ramps, and the ground are reduced. The hitch includes generally a drawbar assembly having a shank and a ballmount pivotally mounted on the shank. The shank is adapted to be received within a conventional receiver-type trailer hitch. An adjustment bracket is carried by the shank and is adapted to releasably attach a ballmount. The ballmount is adapted to receive a conventional hitch ball.

The shank defines a first end configured to be received within a conventional receptor of a trailer hitch. The shank defines at least a first side and a second side. At least one through opening is defined in the first end of the shank, through both the first side and the second side, for receiving a locking pin also cooperatively received in the trailer hitch.

The adjustment bracket is carried at the second end of the shank and defines at least a first side wall and a second side wall. The adjustment bracket defines an inverted substantially U-shaped configuration defining a first side wall disposed on the first side of the shank, a second side wall disposed on the second side of the shank, and a top wall disposed between the upper edges of the first and second side wall. Each of the first and second side walls defines at least one first opening and at least one second opening. Each first opening defined in the first side wall is aligned with a cooperating first opening in the second side wall for receiving a first ballmount locking pin. Likewise, each second opening defined in the first side wall is aligned with a cooperating second opening in the second side wall for receiving a second ballmount locking pin. Thus, the adjustment bracket defines at least one cooperating pair of first openings and at least one cooperating pair of second openings. The cooperating pairs of second openings are radially spaced apart about a first of the cooperating pairs of first openings. Similarly, the cooperating pairs of first openings are radially spaced apart about a first of the cooperating pairs of second openings.

A ballmount is configured to be received between the adjustment bracket first and second side walls. The ballmount defines a first end defining a first opening for cooperatively receiving the first ballmount locking pin and a second opening for cooperatively receiving the second ballmount locking pin. When the first ballmount locking pin is received in the first cooperating pair of first openings, the ballmount is pivotable about the first ballmount locking pin such that the second ballmount locking pin is receivable within the ballmount second opening and any of the plurality of cooperating pairs of second openings.

The second end of the ballmount is adapted to receive a hitch ball in a conventional manner. The second end of the ballmount is configured to minimize interference between the ballmount and the trailer connected thereto.

The hitch is mounted on a towing vehicle by inserting the proximal end of the shank into a trailer hitch receptor carried by the towing vehicle. A shank locking pin is inserted through openings defined by the trailer hitch receptor and the through opening defined in the shank, thereby preventing the shank from being unselectively removed from the trailer hitch receptor. The ballmount is initially disposed in the towing position. In the towing position, the first ballmount locking pin is received through the first cooperating pair of first openings defined by the adjustment bracket and the second ballmount locking pin is received through the first cooperating pair of second openings defined by the adjustment bracket. A trailer is mounted on a hitch ball carried by the ballmount.

In order to tilt the trailer, the trailer jack is operated until it engages the ground. The second ballmount locking pin is removed from the adjustment bracket and ballmount. The trailer jack is then operated again to raise or lower the front end of the trailer until the second ballmount locking pin is receivable within the selected cooperating pair of second openings. At this point, the ballmount second opening is aligned with the selected cooperating pair of selected openings.

In order to gain further lift on the front end of the trailer, and thereby greater reduction in the ramp angle, the second ballmount locking pin is left in the first cooperating pair of second openings and the first ballmount locking pin is removed. The trailer jack is then lowered until the ballmount first opening is aligned with the second cooperating pair of second openings, at which point the first ballmount locking pin is inserted. The second ballmount locking pin is then removed and the trailer jack is operating to raise the front end of the trailer. In order to position the ballmount angularly above this orientation, the trailer jack is raised such that the ballmount is positioned above the selected cooperating pair of openings. When so positioned, the second ballmount locking pin is inserted into the selected cooperating pair of openings and the trailer jack is operated to lower the ballmount onto the locking pin.

The hitch is invertible with respect to the towing vehicle in order to lower the elevation of the hitch ball. The shank and adjustment bracket are inverted relative to the towing vehicle, and the ballmount is inverted with respect to the shank and adjustment bracket. Thus, the ballmount remains in the same relative orientation with the towing vehicle.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is an exploded perspective view of a tiltable trailer hitch constructed in accordance with several features of the present invention;

DETAILED DESCRIPTION OF THE INVENTION

Figure 9:
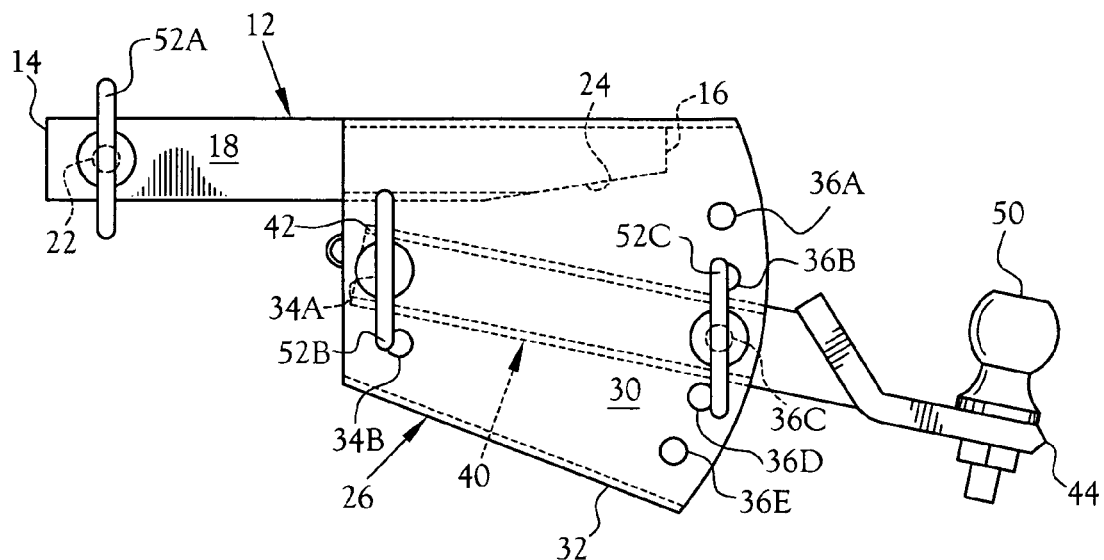
FIG. 9 illustrates the tiltable trailer hitch of FIG. 1 wherein the shank and adjustment bracket are inverted to accomplish lowering of the hitch ball relative to the trailer hitch of the towing vehicle.

A tiltable trailer hitch for assisting in the loading and unloading of a vehicle onto and off of a trailer is disclosed. The tiltable trailer hitch of the present invention is configured to raise the front end of a trailer, thereby lowering the rear end whereby the respective angles between the trailer, the ramps, and the ground are reduced. By reducing these angles, the ability to load and unload the vehicle is enhanced. The tiltable trailer hitch of the present invention is illustrated generally at 10 in the figures. In the preferred embodiment, the tiltable trailer hitch, or hitch 10, is adapted to be used primarily with a trailer 60 having a trailer jack 68. However, it will be understood that the hitch 10 may be used effectively with other trailers 60 as well.

Illustrated in FIG. 1 is an exploded view, in perspective, of the hitch 10 of the present invention. The hitch 10 includes generally a drawbar assembly having a shank 12 and a ballmount 40 pivotally mounted on the shank 12. The shank 12 of the illustrated embodiment is adapted to be received within a conventional receiver-type trailer hitch (not shown). An adjustment bracket 26 is carried by the shank 12 and is adapted to releasably attach the ballmount 40. The ballmount 40 is adapted to receive a conventional hitch ball 50.

The shank 12 defines a first end 14 configured to be received within a conventional receptor of a trailer hitch. Illustrated is a square tube adapted to be received in a Type II or Type III trailer hitch. However, it will be understood that the shank 12 may be adapted to cooperate with other conventional trailer hitches having other configurations. The shank 12 defines at least a first side 18 and a second side 20. At least one through opening 22 is defined in the first end 18 of the shank 12, through both the first side 18 and the second side 20, for receiving a locking pin 52A also cooperatively received in the trailer hitch.

Figure 2:
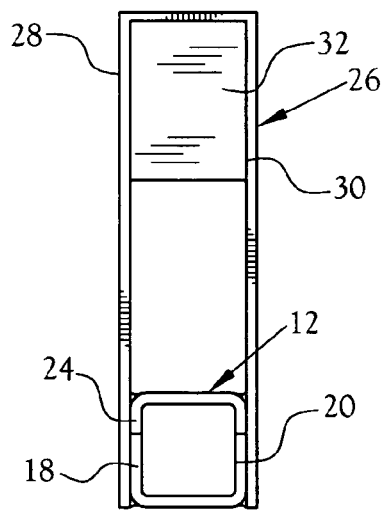
FIG. 2 is an end view of the tiltable trailer hitch of FIG. 1.

The adjustment bracket 26 is carried at the second end 16 of the shank 12. As best illustrated in FIG. 2, the adjustment bracket 26 defines at least a first side wall 28 and a second side wall 30. In the preferred embodiment, the adjustment bracket 26 defines an inverted substantially U-shaped configuration defining a first side wall 28 disposed on the first side 18 of the shank 12, a second side wall 30 disposed on the second side 20 of the shank 12, and a top wall 32 disposed between first and second side walls 28,30. It will be understood that for some materials combinations and dimensions, the top wall 32 may not be necessary in all applications, but provides strengthening of the first and second side walls 28,30 when incorporated.

Each of the first and second side walls 28,30 defines at least one first opening 34 and at least one second opening 36. Each first opening 34 defined in the first side wall 28 is aligned with a cooperating first opening 34 defined in the second side wall 30 for receiving a first ballmount locking pin 52B as will be further described below. Likewise, each second opening 36 defined in the first side wall 28 is aligned with a cooperating second opening 36 defined in the second side wall 30 for receiving a second ballmount locking pin 52C. Thus, the adjustment bracket 26 defines at least one cooperating pair of first openings 34 and at least one cooperating pair of second openings 36.

The cooperating pairs of second openings 36 are radially spaced apart about a first 34A of the cooperating pairs of first openings 34. In the illustrated embodiment, the cooperating pairs of second openings 36 are spaced apart at an angle α of approximately 9°. However, it will be understood that other angular spacings α may be incorporated within the scope of the present invention. Similarly, the cooperating pairs of first openings 34 are radially spaced apart about a first 36A of the cooperating pairs of second openings 36. In the illustrated embodiment, the cooperating pairs of first openings 34 are spaced apart at an angle Δ of approximately 10°.

A ballmount 40 is configured to be received between the adjustment bracket first and second side walls 28,30. The ballmount 40 defines a first end 42 defining a first opening 46 for cooperatively receiving the first ballmount locking pin 52B and a second opening 48 for cooperatively receiving the second ballmount locking pin 52C. In the illustrated embodiment, when the first ballmount locking pin 52B is received in the ballmount first opening 46 and the first cooperating pair of first openings 34A, the ballmount 40 is pivotable about the first ballmount locking pin 52B such that the second ballmount locking pin 52C is receivable within the ballmount second opening 48 and any of the plurality of cooperating pairs of second openings 36. However, when the first ballmount locking pin 52B is received in a second cooperating pair of first openings 34B, the second ballmount locking pin 52C is only receivable within the first pair of cooperating second openings 36A.

The second end 44 of the ballmount 40 is adapted to receive a hitch ball 50 in a conventional manner. To this extent, while the illustrated embodiment includes a single ballmount 40, it will be understood that any conventional ballmount 40 configuration may be incorporated within the scope of the present invention. The second end 44 of the ballmount 40 is configured to minimize interference between the ballmount 40 and the trailer 60 connected thereto. In the illustrated embodiment, the second end 44 of the ballmount 40 is beveled on a top and a bottom edge thereof. However, it will be understood that other configurations may be incorporated within the scope of the present invention.

In the illustrated embodiment, the first cooperating pair of first openings 34A is disposed above the first cooperating pair of second openings 36A such that when the ballmount 40 is secured to the adjustment bracket 26 via these openings 34A,36A, the ballmount 40 is angled downwardly. This orientation is the preferred orientation for towing. The second end 16 of the shank defines an engagement surface 24 disposed at a similar angle to that defined between the respective first pairs of cooperating first and second openings 34A,36A, whereby the ballmount 40 engages and rests upon the engagement surface 24 when in the preferred towing position.

Figure 5:
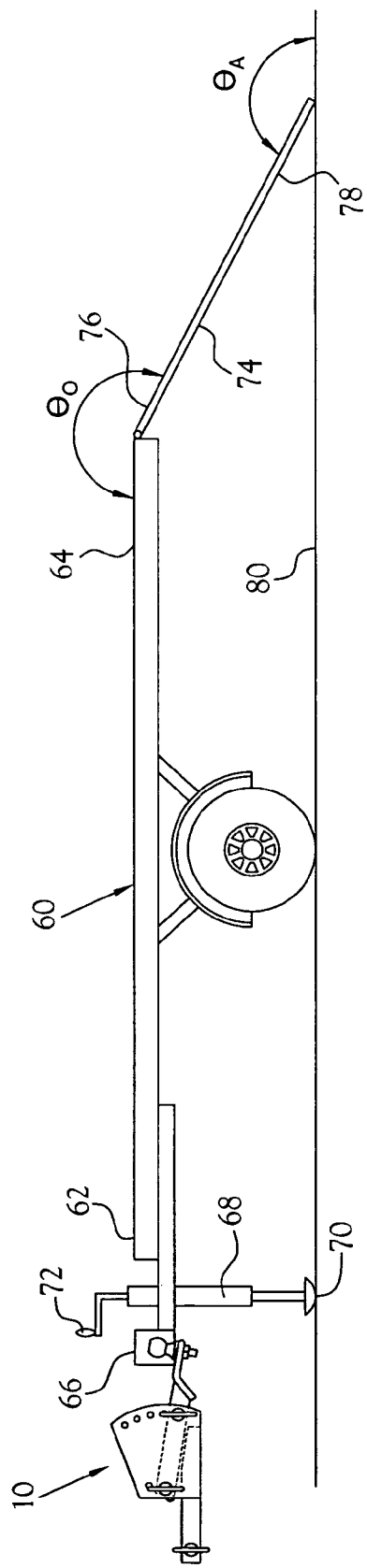
FIG. 5 illustrates a side elevation view of the tiltable trailer hitch of FIG. 3 showing the tiltable trailer hitch being mounted on a towing vehicle and a trailer being secured thereto.
Figure 6:
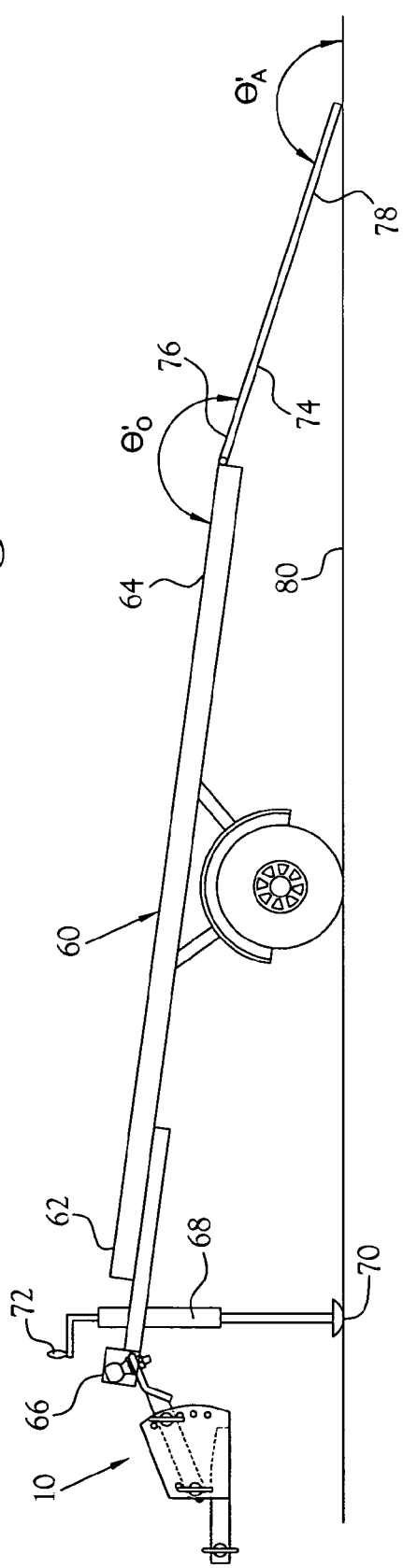
FIG. 6 illustrates a side elevation view of the tiltable trailer hitch of FIG. 3 showing the tiltable trailer hitch being mounted on a towing vehicle and a trailer being secured thereto, with the trailer being tilted.

Referring to FIGS. 5 and 6, the hitch 10 is mounted on a towing vehicle by inserting the first end 14 of the shank 12 into a trailer hitch receptor carried by the towing vehicle. A shank locking pin 52A is inserted through openings defined by the trailer hitch receptor and the through opening 22 defined in the shank 12, thereby preventing the shank 12 from being unselectively removed from the trailer hitch receptor. The ballmount 40 is initially disposed in the towing position. To this extent, the first ballmount locking pin 52B is received through the first cooperating pair of first openings 34A defined by the adjustment bracket 26. The second ballmount locking pin 52C is received through the first cooperating pair of second openings 36A defined by the adjustment bracket 26. A trailer 60 is mounted on a hitch ball 50 carried by the ballmount 40.

Figure 4:
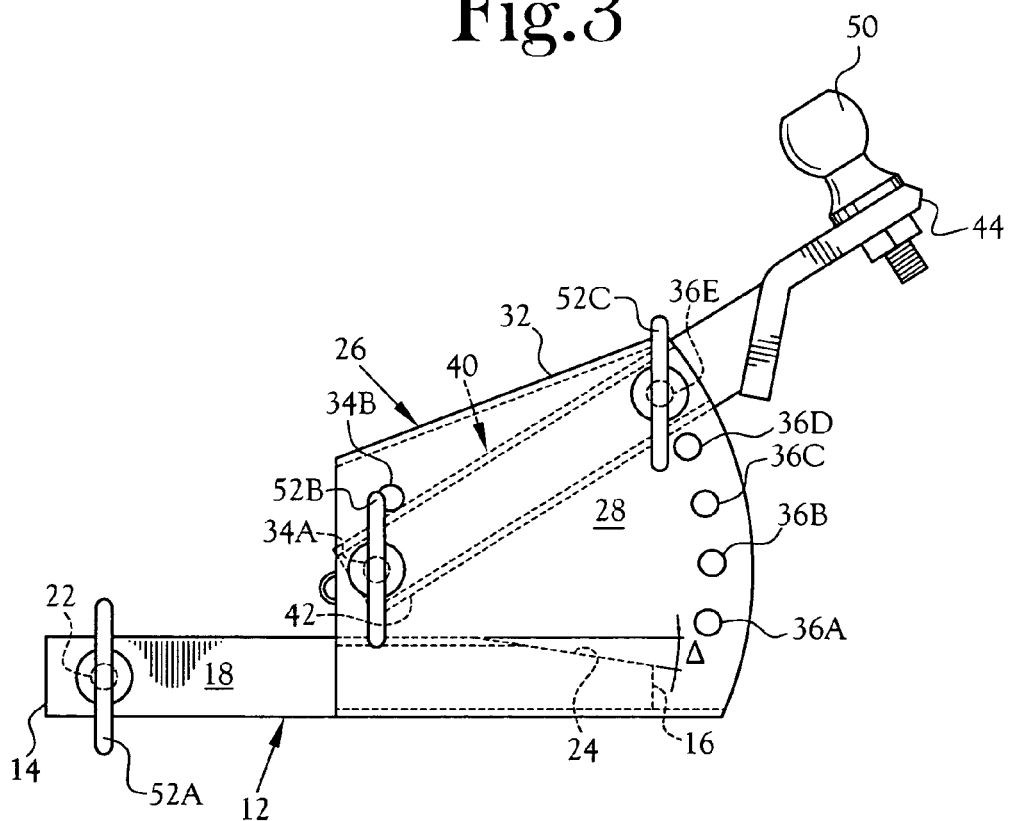
FIG. 4 is a side elevation view of the tiltable trailer hitch of FIG. 3, wherein the second ballmount locking pin is received within the last cooperating pair of second openings, which defines a raised position.

In order to tilt the trailer 60, an actuator 72 of the trailer jack 68 is operated until the foot 70 engages the ground. The second ballmount locking pin 52C is removed from the adjustment bracket 26 and ballmount 40. The trailer jack 68 is then operated again to raise or lower the front end 62 of the trailer 60 until the second ballmount locking pin 52C is receivable within the selected cooperating pair of second openings 36. At this point, the ballmount second opening 48 is aligned with the selected cooperating pair of selected openings 36. FIG. 4 illustrates the orientation of the ballmount 40 at its highest lift point for the illustrated embodiment while the first ballmount locking pin 52B is received within the first cooperating pair of first openings 34A.

Figure 3:
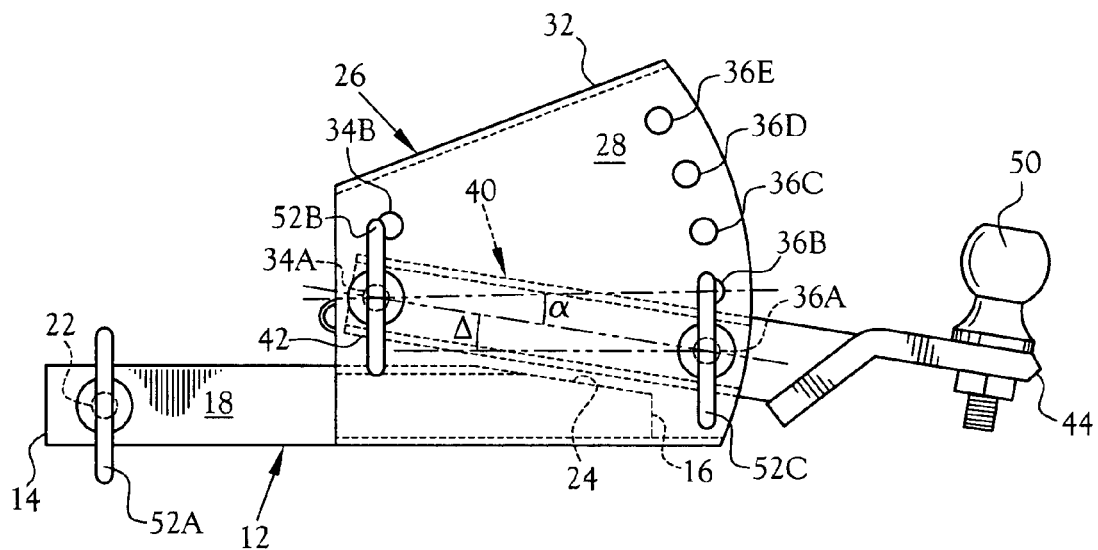
FIG. 3 is a side elevation view of the tiltable trailer hitch of FIG. 1, wherein the first ballmount locking pin is received within the first cooperating pair of first openings, and the second ballmount locking pin is received within the first cooperating pair of second openings, which defines the towing position.

Referring to FIG. 5, with the hitch 10 disposed in the towing position as illustrated in FIG. 3, an obtuse angle $\theta_0$ is defined between the back end 64 of the trailer 60 and the top end 76 of the ramp 74. An acute angle $\theta_A$ is defined between the bottom end 78 of the ramp 74 and the ground 80. However, when the ballmount 40 is oriented in a raised position, the trailer 60 is tilted as shown in FIG. 6. In this orientation, the trailer 60 is tilted such that each of the angles $\theta_0'$ and $\theta_A'$ approach 180°, thereby reducing the risk of interference between either of the trailer 60, the ramp 74, or the ground 80, and the payload.

Figure 7:
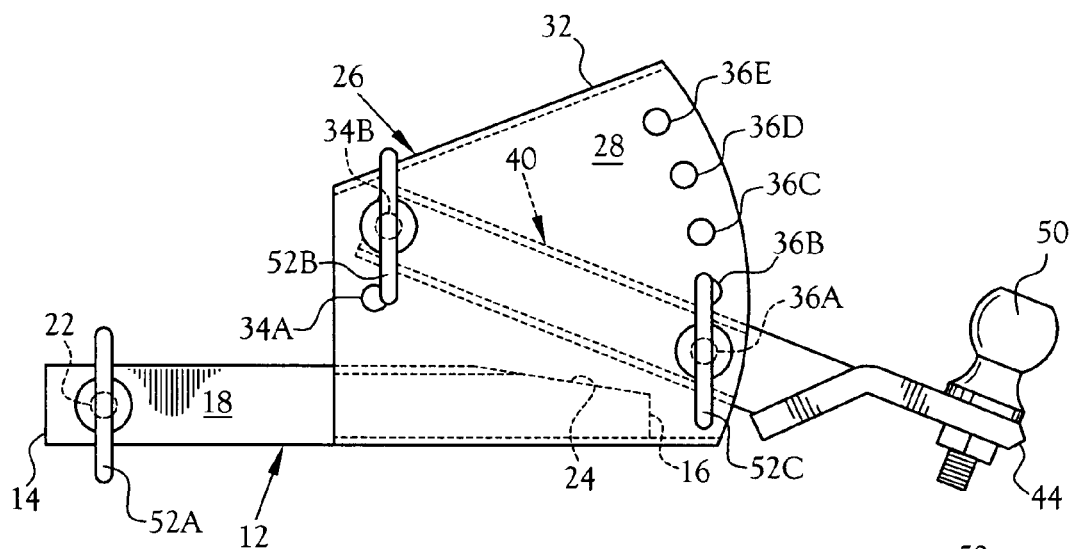
FIG. 7 is a side elevation view of the tiltable trailer hitch of FIG. 1, wherein the first ballmount locking pin is received within the second cooperating pair of first openings, and the second ballmount locking pin is received within the first cooperating pair of second openings.
Figure 8:
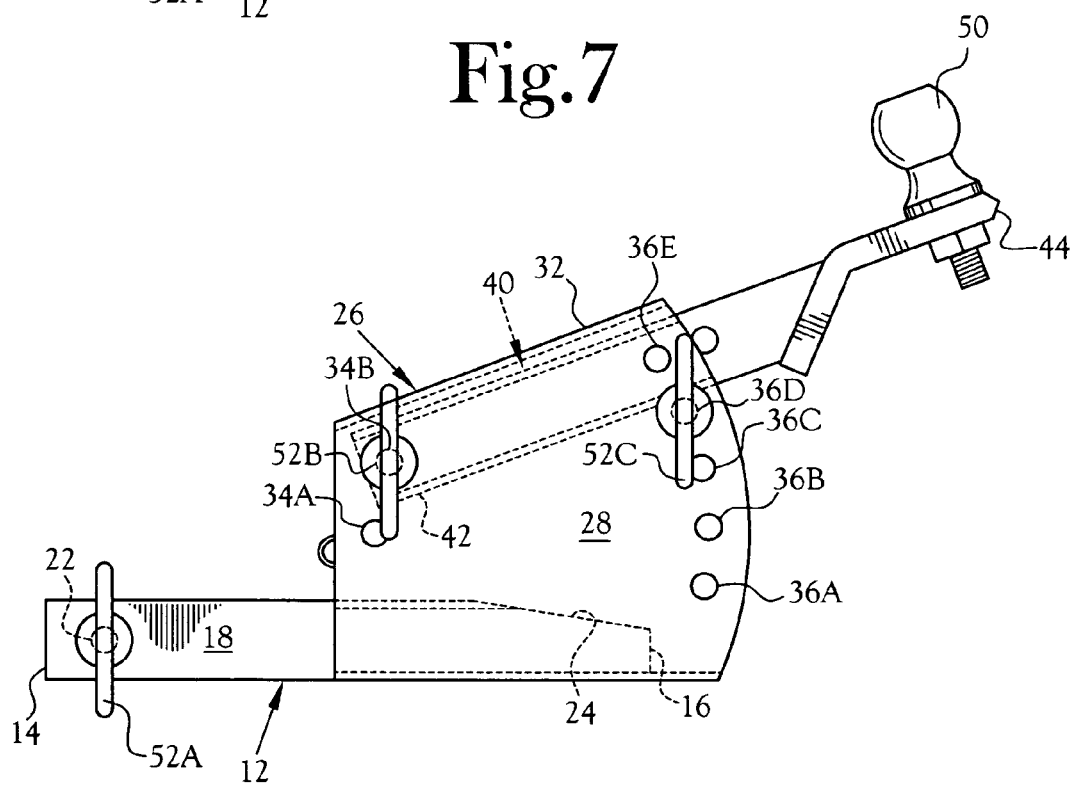
FIG. 8 is a side elevation view of the tiltable trailer hitch of FIG. 7, wherein the second ballmount locking pin is received within the second cooperating pair of first openings and the ballmount is positioned to rest on the second ballmount locking pin.

As illustrated in FIGS. 7 and 8, to gain further lift on the front end 62 of the trailer 60, and thereby greater reduction in the ramp angle $\theta_0$, and thereby an increase in the ramp angle $\theta_A$, the second ballmount locking pin 52C is left in the first cooperating pair of second openings 36A and the first ballmount locking pin 52B is removed. The trailer jack 68 is then lowered until the ballmount first opening 46 is aligned with the second cooperating pair of first openings 34B, at which point the first ballmount locking pin 52B is inserted, as illustrated best in FIG. 7. Then, as illustrated in FIG. 8, the second ballmount locking pin 52C is removed and the trailer jack 68 is operated to raise the front end 62 of the trailer 60. Because the ballmount second opening 48 will align only with the first cooperating pair of second openings 36A when the first ballmount locking pin 52B is secured in this manner, in order to position the ballmount 40 angularly above this orientation, the trailer jack 68 is raised such that the ballmount 40 is positioned above the selected cooperating pair of second openings 36. When so positioned, the second ballmount locking pin 52C is inserted into the selected cooperating pair of second openings 36 and the trailer jack 68 is operated to lower the ballmount 40 onto the second ballmount locking pin 52C. It will be understood that this orientation is intended for the purpose of loading and unloading the trailer 60, and is not intended for towing.

In a further implementation of the present invention, the hitch 10 is invertible with respect to the towing vehicle in order to lower the elevation of the hitch ball 50. In this implementation illustrated in FIG. 9, the shank 12 and adjustment bracket 26 are inverted relative to the towing vehicle, and the ballmount 40 is inverted with respect to the shank 12 and adjustment bracket 26. Thus, the ballmount 40 remains in the same relative orientation with the towing vehicle. This implementation is especially useful for towing vehicles having a relatively high hitch receptor as compared to the elevation of the trailer tongue 66.

It will be understood that various configurations of the disclosed invention may be incorporated within the spirit of the present invention. Specifically, more or fewer cooperating pairs of first and second openings 34,36 may be incorporated in order to provide a greater or smaller degree of lift. Further, the spacing between the cooperating pairs of first and second openings 34,36, and consequently the spacing between the ballmount first and second openings 34,36, may be increased or decreased in order to accomplish similar results. As discussed above, the angular spacing A between each of the first cooperating pairs of openings 34, as well as the angular spacing a between each of the second cooperating pairs of openings 36 may be varied as well. Further, the length of the ballmount 40 may be varied.

From the foregoing description, it will be recognized by those skilled in the art that a tiltable trailer hitch has been provided. The tiltable trailer hitch of the present invention is configured to raise the front end of a trailer, thereby lowering the rear end whereby the respective angles between the trailer, the ramps, and the ground are reduced. By reducing these angles, the ability to load and unload the vehicle is enhanced.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned, I claim:

1. A tiltable trailer hitch for tilting a trailer for reducing interference between either of a trailer, a ramp, or the ground, and a vehicle being loaded onto or unloaded from the trailer, said tiltable trailer hitch comprising:

a shank adapted to be received within a conventional receiver-type trailer hitch, said shank defining a first end and a second end, said first end configured to be received within a conventional receptor of a trailer hitch, said shank defining at least one through opening for receiving a shank locking pin cooperatively receivable in the trailer hitch;

an adjustment bracket carried by said shank, said adjustment bracket defining at least a first side wall and a second side wall, each of said first side wall and said second side wall defining at least one first opening and at least one second opening, each of said at least one first opening defined in said first side wall being aligned with one of said at least one first opening defined in said second side wall to define at least one cooperating pair of first openings for receiving a first ballmount locking pin, each of said at least one second opening defined in said first side wall being aligned with one of said at least one second opening defined in said second side wall to define at least one cooperating pair of second openings for receiving a second ballmount locking pin; and a ballmount pivotally mounted on said adjustment bracket, said ballmount being adapted to receive a conventional hitch ball, said ballmount being configured to be received between said first side wall and said second wall, and wherein said ballmount defines a first opening for cooperatively receiving said first ballmount locking pin with said at least one cooperating pair of first openings and a second opening for cooperatively receiving said second ballmount locking pin with said at least one cooperating pair of second openings.

2. The tiltable trailer hitch of claim 1 wherein said adjustment bracket defines a plurality of said at least one cooperating pair of second openings, said plurality of cooperating pairs of second openings being radially spaced apart about a first of said at least one cooperating pair of first openings, whereby said ballmount is selectively raised and lowered about said first ballmount locking pin and is secured at a selected location with said second ballmount locking pin.

3. The tiltable trailer hitch of claim 2 wherein said adjustment bracket defines a plurality of said at least one cooperating pair of first openings, said plurality of cooperating pairs of first openings being radially spaced apart about a first of said plurality of cooperating pairs of second openings, whereby said ballmount is selectively raised and lowered about at least one of said first ballmount locking pin and said second ballmount locking pin.

4. The tiltable trailer hitch of claim 1 wherein said adjustment bracket defines a plurality of said at least one cooperating pair of first openings, said plurality of cooperating pairs of first openings being radially spaced apart about a first of said at least one cooperating pair of second openings, whereby said ballmount is selectively raised and lowered about said second ballmount locking pin and is secured at a selected location with said first ballmount locking pin.

5. The tiltable trailer hitch of claim 1 wherein said adjustment bracket defines an inverted substantially U-shaped configuration defining said first side wall disposed on a first side of said shank, said second side wall disposed on a second side of said shank, and a top wall disposed between said first side wall and said second side wall.

6. A tiltable trailer hitch for tilting a trailer for reducing interference between either of a trailer, a ramp, or the ground, and a vehicle being loaded onto or unloaded from the trailer, said tiltable trailer hitch comprising:

a shank adapted to be received within a conventional receiver-type trailer hitch, said shank defining a first end and a second end, said first end configured to be received within a conventional receptor of a trailer hitch, said shank defining at least one through opening for receiving a shank locking pin cooperatively receivable in the trailer hitch;

an adjustment bracket carried by said shank, said adjustment bracket defining at least a first side wall and a second side wall, each of said first side wall and said second side wall defining at least one first opening and a plurality of second openings, each of said at least one first opening defined in said first side wall being aligned with one of said at least one first opening defined in said second side wall to define at least one cooperating pair of first openings for receiving a first ballmount locking pin, each of said plurality of second openings defined in said first side wall being aligned with one of said plurality of second openings defined in said second side wall to define a plurality of cooperating pairs of second openings for receiving a second ballmount locking pin, wherein said plurality of cooperating pairs of second openings are radially spaced apart about a first of said at least one cooperating pair of first openings; and a ballmount pivotally mounted on said adjustment bracket, said ballmount being adapted to receive a conventional hitch ball, said ballmount configured to be received between said first side wall and said second wall of said adjustment bracket, said ballmount defining a first opening for cooperatively receiving said first ballmount locking pin with said at least one cooperating pair of first openings and a second opening for cooperatively receiving said second ballmount locking pin with one of said plurality of cooperating pairs of second openings, said ballmount being selectively raised and lowered about said first ballmount locking pin and is secured at a selected location with said second ballmount locking pin.

7. The tiltable trailer hitch of claim 6 wherein said adjustment bracket defines a plurality of said at least one cooperating pair of first openings, said plurality of cooperating pairs of first openings being radially spaced apart about a first of said plurality of cooperating pairs of second openings, whereby said ballmount is further selectively raised and lowered about said second ballmount locking pin.

8. The tiltable trailer hitch of claim 6 wherein said adjustment bracket defines an inverted substantially U-shaped configuration defining said first side wall disposed on a first side of said shank, said second side wall disposed on a second side of said shank, and a top wall disposed between said first side wall and said second side wall.

9. A tiltable trailer hitch for tilting a trailer for reducing interference between either of a trailer, a ramp, or the ground, and a vehicle being loaded onto or unloaded from the trailer, said tiltable trailer hitch comprising:

a shank adapted to be received within a conventional receiver-type trailer hitch, said shank defining a first end and a second end, said first end configured to be received within a conventional receptor of a trailer hitch, said shank defining at least one through opening for receiving a shank locking pin cooperatively receivable in the trailer hitch;

an adjustment bracket carried by said shank, said adjustment bracket defining an inverted substantially U-shaped configuration defining a first side wall disposed on a first side of said shank, a second side wall disposed on a second side of said shank, and a top wall disposed between said first side wall and said second side wall, each of said first side wall and said second side wall defining a plurality of first openings and a plurality of second openings, each of said plurality of first openings defined in said first side wall being aligned with one of said plurality of first openings defined in said second side wall to define a plurality of cooperating pairs of first openings for receiving a first ballmount locking pin, each of said plurality of second openings defined in said first side wall being aligned with one of said plurality of second openings defined in said second side wall to define a plurality of cooperating pairs of second openings for receiving a second ballmount locking pin, wherein said plurality of cooperating pairs of second openings are radially spaced apart about a first of said at least one cooperating pair of first openings, and wherein said plurality of cooperating pairs of first openings are radially spaced apart about a first of said plurality of cooperating pairs of second openings; and a ballmount pivotally mounted on said adjustment bracket, said ballmount being adapted to receive a conventional hitch ball, said ballmount configured to be received between said first side wall and said second wall of said adjustment bracket, said ballmount defining a first opening for cooperatively receiving said first ballmount locking pin with said at least one cooperating pair of first openings and a second opening for cooperatively receiving said second ballmount locking pin with one of said plurality of cooperating pairs of second openings, said ballmount being selectively raised and lowered about either of said first ballmount locking pin and said second ballmount locking pin and is secured at a selected location with both of said first ballmount locking pin and said second ballmount locking pin.

* * * * *